UNITED STATES PATENT OFFICE.

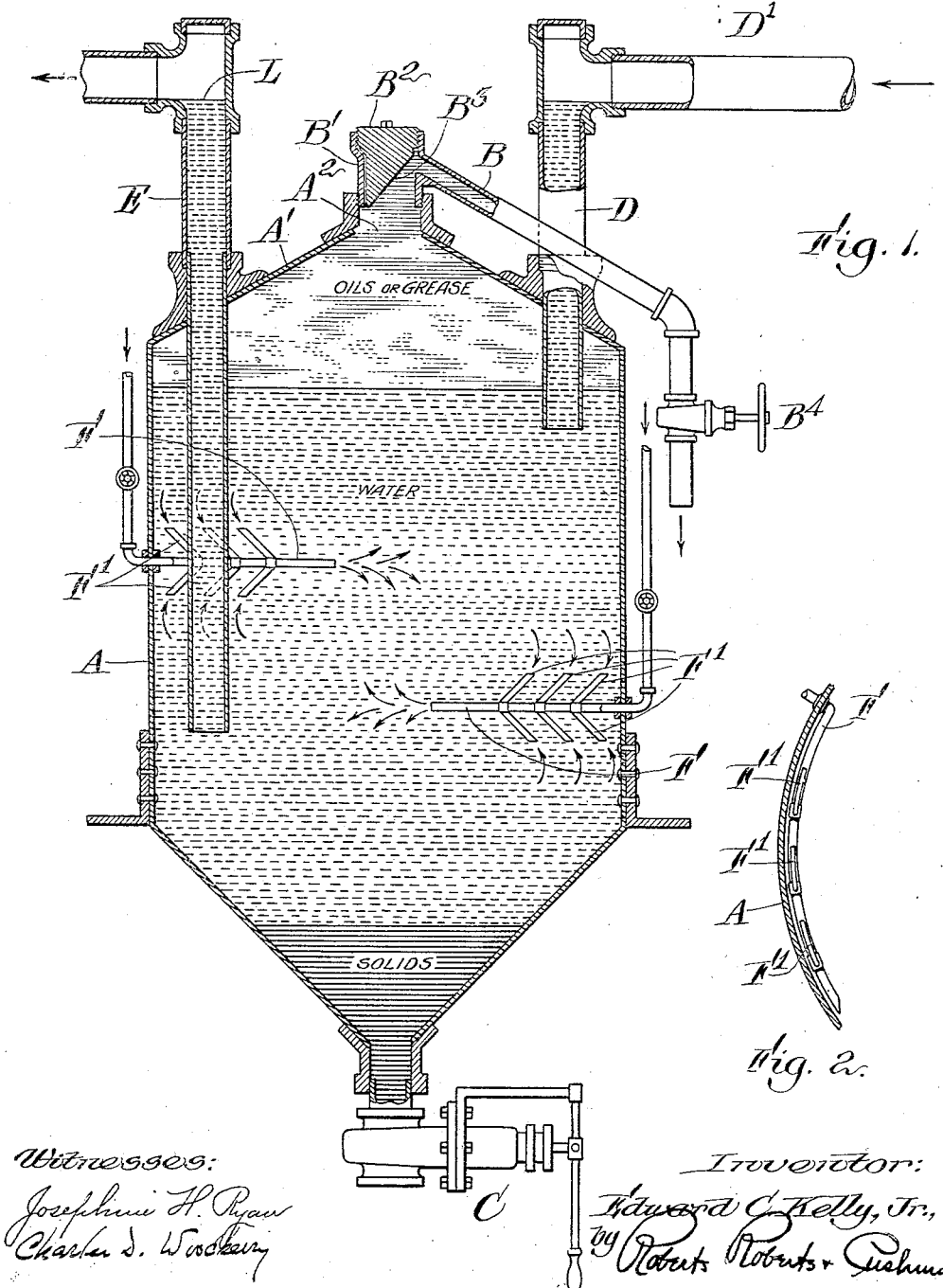

EDWARD C. KELLY, JR., OF BOSTON, MASSACHUSETTS, ASSIGNOR TO KELLY SEPARATOR COMPANY, OF BOSTON, MASSACHUSETTS, A CORPORATION OF MASSACHUSETTS.

SEPARATOR-TRAP.

1,159,044.

Specification of Letters Patent.

Patented Nov. 2, 1915.

Application filed September 11, 1914. Serial No. 861,164.

*To all whom it may concern:*

Be it known that I, EDWARD C. KELLY, Jr., a citizen of the United States, and resident of Boston, in the county of Suffolk and State of Massachusetts, have invented new and useful Improvements in Separator-Traps, of which the following is a specification.

My invention relates to the separation of oils, grease, or other generally similar substances from the waste water of kitchens, laundries, garages and the like, and consists in an assemblage of related structural factors by which the proper separation of those materials such as oils or grease, which should be prevented from passing into drains or sewers, is effectively accomplished, and the removal of the grease, etc., easily effected.

In the drawings hereto annexed which illustrate my invention, Figure 1 shows a grease trap in vertical section; and Fig. 2 shows a portion of the said grease trap in horizontal section, illustrating the arrangement of one of the displacement and agitating pipes hereinafter described.

The trap illustrated in the drawings comprises a trap chamber A which is for the most part preferably cylindrical and terminates at top and bottom in cones. The upper cone A' terminates in an opening $A^2$ which is surmounted by the threaded elbow B', the latter being closed by a threaded plug $B^2$. A tap pipe for grease and the like, marked B, forms part of the elbow fixture B', and the plug $B^2$ may with convenience be diagonally cut or slabbed at $B^3$ to afford communication from the interior of the trap chamber to the tap pipe B. This pipe is controlled by the closure at $B^4$, the latter being by preference a simple valve such as a gate valve. The waste, consisting of mixed liquids, most of which will usually be water, enters the trap chamber through the inlet D, which communicates with the waste pipe D'. The lower end of the inlet D extends downward a short distance into the trap chamber A and preferably to a point low enough in said chamber normally to prevent accumulation of oils or grease from reaching a level as low as the inner end of the inlet pipe D.

The outlet pipe for water is at E and extends upward to a level above the top of the trap chamber A, that is to say, extends to a point higher than the upper part of the curve or elbow of which the pipe B forms a part. The level of water, therefore, in the pipe E will stand normally at such a point as L, which being above the highest point of the interior of the trap chamber keeps the liquid in the interior of the chamber always under a moderate head or pressure.

When mixed liquids descend into the trap through the pipes D' and D, their entrance causes a displacement of some of the water standing in the pipe E, the surplus being drained off to the sewer. The lower end of the pipe E being at a considerably lower level in the trap chamber than the lower end of the pipe D and these two pipes being preferably also situated at opposite sides of the trap chamber, the influx of mixed liquids through the pipe D, even though voluminous and somewhat violent, will not be likely to carry any oil, grease, or any other undesirable matter to the pipe E, but these lighter materials will have ample opportunity to rise in the trap chamber and add to the accumulation of similar materials already in the top of the chamber under its conical head A'.

So long as the closure $B^4$ remains closed, which is its normal position, the circumstance that all the liquids in the trap chamber are under the head produced by the high level L keeps the top of the chamber full and prevents agitation due to influx of mixed liquids through the pipe D from materially disturbing the quiet of the lower surface of the body of oil or grease. Whenever it is desired to remove the accumulations from the top of the trap chamber, the closure $B^4$ may be opened, and then the head, due to the level of water in the pipe E, will start the flow of grease, etc., through the pipe B. This pipe will presently act as a siphon and will draw the grease from the top of the pipe until by depletion of the pipe D of its liquid air is introduced into the trap chamber and the siphon breaks.

If it be desired to withdraw all the oil or grease which has accumulated in the top of the trap, all that is necessary is to introduce water or other fluid into the trap chamber so as to maintain the presence of liquid in the pipe D. This may be done by simply causing water to flow into the pipe D', which, keeping the pipe D full, will prevent air from entering the trap chamber and breaking the siphon formed by the elbow B' and pipe B.

Supply pipes may with advantage be especially provided for the introduction of water, steam or air into the trap chamber; such auxiliary supply pipes are shown at F, and these preferably are so disposed that they lie close to the sides of the trap chamber A, as illustrated in Fig. 2. Each pipe F is opened at its extreme inner end and is also provided with induction pipes F, so that when a liquid under pressure is introduced through either of the pipes F the ejector effect of the current in the pipe F will cause the liquid in the trap chamber to enter the induction pipe F', thus setting up a stirring and circulating movement in the liquid. This treatment of the contents of the trap chamber will be found effective to break up any lotted or filmy masses, such as sometimes form where solid matter and grease are present in waste water and when separated from the grease the solid portions of these masses settle to the bottom of the trap from which they can be periodically removed by means of the gate valves at C, while the oil or greasy constituents rise and join the trap grease, etc., at the top of the trap chamber. The pipe F may be connected with a water supply or a supply of compressed air or with a steam supply, or may be so arranged as to communicate at will with a supply of water, steam or air. When connected with a water supply the pipes F may be used to introduce displacement water into the trap chamber for the purpose of removing all of the oil or grease which has collected in the top of the chamber by displacing it and causing it to run out through the pipe B past the closure B⁴ and into whatever receptacle may be provided for the purpose. The pipe F is supplied with a control valve, as shown, adjacent to the trap chamber, so that the trap may be discharged of oil or grease conveniently.

The type of grease trap above described is intended particularly for situations in which the mixed liquids which enter the trap come from a high level and therefore enter the trap chamber with considerable force. The fact that the top of the trap chamber is normally closed prevents any surging of greasy matters out of the trap no matter how violent and copious may be the introduction of mixed liquid into the trap itself.

What I claim and desire to secure by Letters Patent is:

1. A trap for grease and the like, the combination of a trap chamber, an inlet for mixed liquids thereto and an outlet therefrom for water waste, the water waste outlet extending to a level above that of the trap chamber, an outlet from the top of the chamber for grease and the like, a controlling closure for the said last named outlet, and additional means with control adjacent to the trap chamber for introducing displacing fluid to the interior of the trap chamber.

2. A trap for grease and the like, the combination of a trap chamber, an inlet for mixed liquids thereto and an outlet therefrom for water waste, the water waste outlet extending to a level above that of the trap chamber, an outlet from the top of the chamber for grease and the like, a controlling closure for the said last named outlet, and means for introducing displacing fluid to the interior of the trap chamber, said means disposed in the chamber to effect a rotary circulation.

3. In a trap for grease and the like, the combination of a trap chamber, an inlet for mixed liquids thereto and an outlet therefrom for water waste, the water waste outlet extending to a level above that of the trap chamber, a siphon outlet from the top of the chamber for grease and the like, a controlling closure for the siphon outlet, and additional means with control adjacent to the trap chamber for introducing displacing fluid to the interior of the trap chamber.

4. In a trap for grease and the like, the combination of a trap chamber, an inlet thereto for mixed liquids extending through the top of the chamber, an outlet from the trap chamber extending from a low point therein upward to a level above the top of the chamber, an outlet from the upper part of the chamber for grease and the like, a controlling closure in said last named outlet, and additional means with control adjacent to the trap chamber for introducing displacing fluid to the interior of the trap chamber.

Signed by me at Boston, Massachusetts, this eighth day of September, 1914.

EDWARD C. KELLY, Jr.

Witnesses:
CHARLES D. WOODBERRY,
FLORENCE A. COLLINS.